United States Patent [19]

Schorr

[11] 3,994,484

[45] Nov. 30, 1976

[54] WORK POSITIONER FOR RADIAL SAWS

[76] Inventor: Yale Schorr, 4004 Lanark Lane, Houston, Tex. 77035

[22] Filed: Dec. 19, 1975

[21] Appl. No.: 642,562

[52] U.S. Cl. .............................................. 269/315

[51] Int. Cl.$^2$ .............................................. B23Q 3/10

[58] Field of Search ............ 269/303, 307, 315, 97; 83/467 R, 467 A, 468

[56] References Cited

UNITED STATES PATENTS

| | | | |
|---|---|---|---|
| 2,618,300 | 11/1952 | Freudenthaler | 83/468 |
| 2,747,625 | 5/1956 | Small | 83/468 |
| 3,095,673 | 7/1963 | Born et al. | 83/468 |

*Primary Examiner*—Al Lawrence Smith
*Assistant Examiner*—Robert C. Watson
*Attorney, Agent, or Firm*—Ranseler O. Wyatt

[57] ABSTRACT

A work positioner for radial arm saws adapted to be mounted on the fence of a radial arm saw, and the like, which may be quickly and easily positioned and having a longitudinally movable block mounted therein which may be quickly and easily adjusted to the exact measurement desired, and having novel means for releasably anchoring said device to a fence and releasably anchoring said movable block in position in the device.

5 Claims, 3 Drawing Figures

Fig. 1
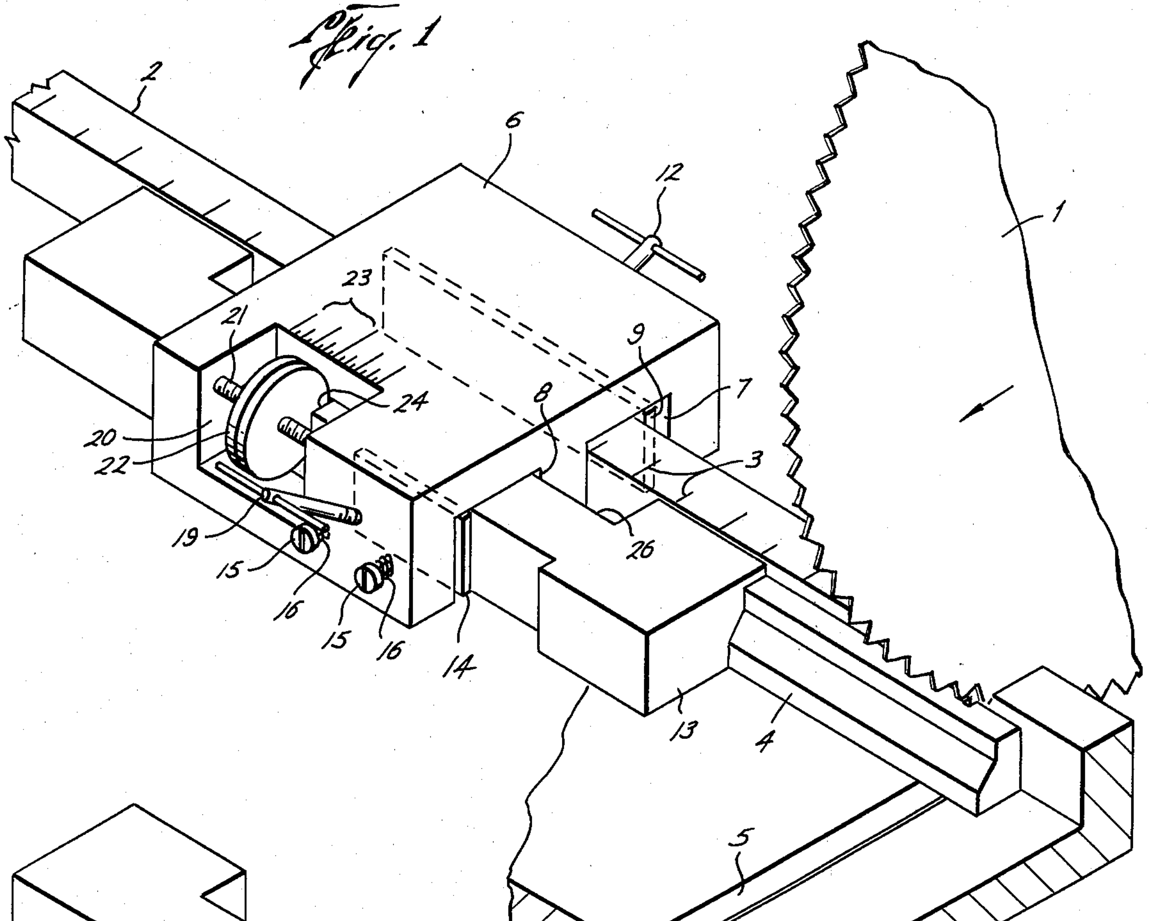
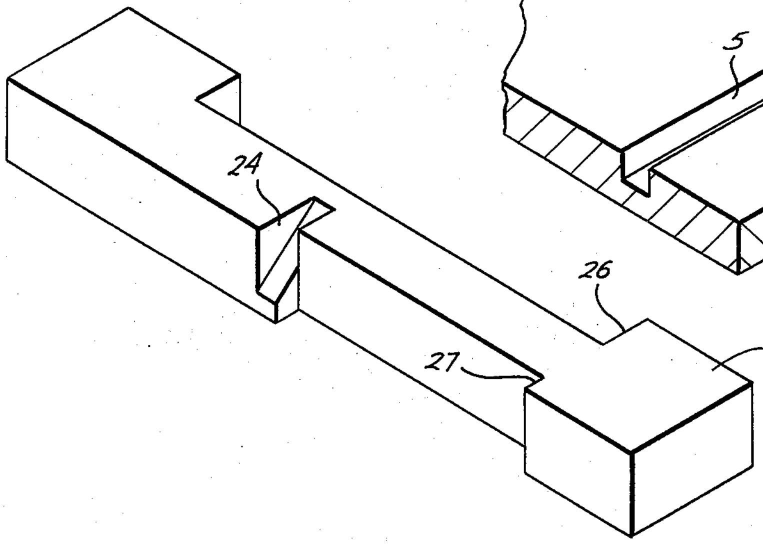
Fig. 2
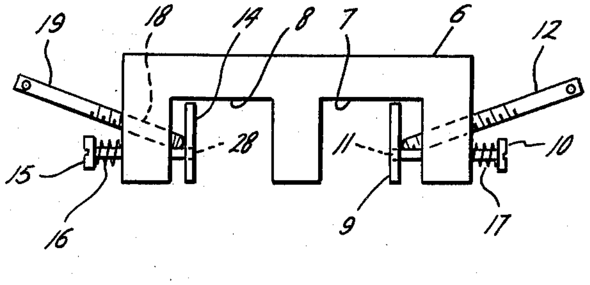
Fig. 3

WORK POSITIONER FOR RADIAL SAWS

BACKGROUND OF THE INVENTION

In radial arm saws where many pieces of exactly the same size are often cut, it is the custom to fasten some sort of work piece block on the fence to permit repeated cuts at a minimum of positioning timing. Such blocks are often difficult to position with exactness, and where it is necessary to remove the block for other work, it is difficult to replace them at exactly the same position as previously positioned, as is necessary in doing work requiring fine adjustments, such as cabinet work. It is an object of this invention to provide a means for releasably anchoring a block in position of the fence, and for accurately adjusting a movable block carried by the fence block, to the exact position desired, and providing means for removing said block and replacing same at the exact position desired with a minimum loss of time.

SUMMARY OF THE INVENTION

A work piece for radial arm saws and the like, wherein a fence block is provided for mounting on the fence of a radial arm saw and having means for releasably locking said block in position on the fence, and having a movable block and means for locking said movable block in position, said movable block having means for moving same longitudinally, on a line parallel with said fence block, for fine adjustment.

BRIEF DESCRIPTION OF THE DRAWINGS

FIG. 1 is a top plan view of the device, mounted on a fence.

FIG. 2 is an enlarged view of the traveling block employed, and

FIG. 3 is an end view of the fence block employed, dismounted from the fence, and with the traveling block removed.

DESCRIPTION OF THE PREFERRED EMBODIMENT

In the drawings, the numeral 1 designates a radial saw having the usual fence 2 which may be provided with the graduates 3 for determining the length of a work piece as 4 to be cut. A saw channel 5 is provided in the fence 2 in alignment with the saw blade 1. The block 6 is provided with the fence receiving channel 7 formed longitudinally in the block 6, and a traveling block channel 8 parallel with the channel 7. Mounted in the fence channel 7 is the clamp member 9, which is a plate fitting longitudinally in the channel 7, and maintained yieldably in abutting relation with one side wall of the channel 7 by means of the bolts 10, 10, which are extended through the one side wall of the fence block adjacent the channel 7, and in threaded connection with internally threaded orifices 11, 11 in the plate 9. An externally threaded rotatable bolt 12 is mounted in an internally threaded port in the fence block 6 extending through the side wall adjacent said channel 7, the lowermost end of the bolt 12 bearing against the plate 9, and the port through the side wall of the fence block being on a downwardly and inwardly directed angle, and the uppermost end of the bolt 12 having a cross piece for easy manual rotation of the belt. Springs 17, 17 are mounted on the outwardly extended ends of the bolts 10, 10, which constantly urge the plate 9 towards abutting relation with the outside wall of the channel 7.

Another channel 8, parallel with the channel 7, is formed in the fence block 6 and is adapted to receive the movable block 13. A plate 14 forming a clamp member is mounted longitudinally in the channel 8 adjacent one side wall of said channel, through which wall the bolts 15, 15 extend, said bolts being externally threaded and received by the internally threaded orifices such as 28, in the plate 14. Springs 16, 16 on the bolts 15, 15, constantly urge the plate 14 into abutting relation with the side wall of the channel 8 through which the bolts 15, 15 extend. An externally threaded bolt 19 is mounted in the internally threaded port 18 through the said wall of the channel 8 and the end of which bears against the plate 14.

An exposed chamber 20 is formed in the fence block 6 in which an externally threaded shaft 21 is mounted, and on said shaft is mounted the adjusting wheel 22. An annular peripheral groove is formed in the center of the outside surface of the wheel 22, which may be aligned with the indicia 23 on the fence block 6. The chamber 20 extends into the channel 8, and the wheel 22 extends into a notch 24 in the traveling block 13. The traveling block 13 has the reduced area on one side, as 26, and the reduced area 27 on the other side. The reduced area 27 limits the travel of the traveling block 13, and the enlarged ends abutting the fence 2 along one of their side walls.

In use, when a particular length of material is needed in quantity, the fence block 6 is mounted on the fence 2 at the approximate position desired, the channel 7 receiving the fence, and the bolt 12 then tightened to move the clamp member 9 against the fence and locking the fence block in place. The wheel 22 is then rotated to move the traveling block 13, mounted in the channel 8, to the exact position necessary for the cut desired, and the bolt 19 then rotated, moving the plate 14 against the traveling block 13, locking same in place. In the event the saw is needed for other work before the required number of cuts have been made, the bolt 12 may be reversed, and the fence block lifted from the fence, and when the saw is again free for use in the quantity cut operation, the fence block again replaced at its former position, and the clamp member moved to clamping position, and the quantity cutting continued.

The adjusting wheel 22 may be divided into quadrants, each being colored a distinctive color, so that the user may quickly and easily make quarterly adjustments in the wheel where slight variations in the positioning of the block is desired.

What I claim is:

1. In a work positioner for radial arm saws, a block having a fence receiving channel therein, a plate in said channel, means for constantly urging said plate in retracted position, means movable against said plate to move said plate into locking position, a traveling block channel in said block, a traveling block mounted in said channel and a plate mounted in said channel, said plate having means for constantly urging said plate into retracted position, means for moving said plate into locking position against said traveling block for selectively locking said block against longitudinal movement.

2. The device defined in claim 1 wherein means are provided for longitudinally adjusting said traveling block to acquire accurate positioning of said traveling block in said channel.

3. The device defined in claim 1 wherein said means for moving said plates into locking position comprises an externally threaded bolt extending through internally threaded parts in said fence block, the ends of said last mentioned bolts bearing against said respective plates.

4. The device defined in claim 1, and means for adjusting the position of said traveling block longitudinally comprising a chamber in said fence block, said chamber extending into said traveling block channel, a slot in said traveling block, an externally threaded shaft mounted in said chamber and a wheel mounted on said shaft and extending into said slot in said traveling block, indicia on said fence block adjacent said chamber providing a guide for the positioning of said wheel which determines the positioning of said traveling block.

5. The device defined in claim 1, wherein said traveling block has reduced areas on the respective longitudinal side walls thereof, providing means for limiting the longitudinal movement of said traveling block and providing enlarged end members the inside vertical side walls of which abut the radial saw fence.

* * * * *